(No Model.)
C. HUCK.
TELEPHONE AND TELEGRAPH CABLE.
No. 284,425. Patented Sept. 4, 1883.
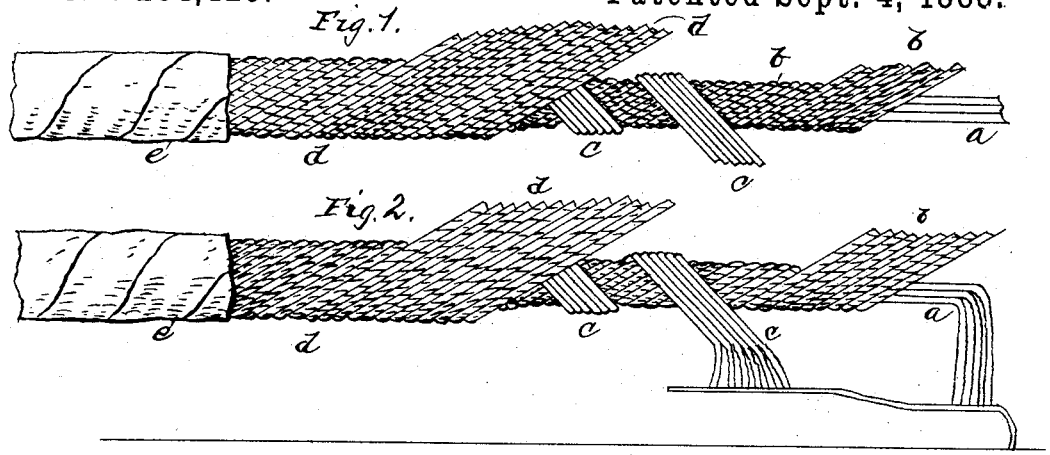
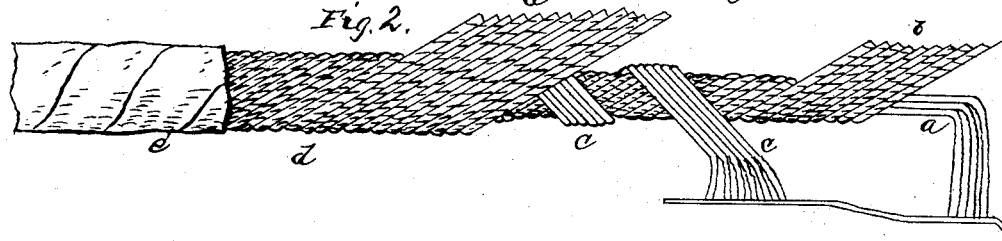
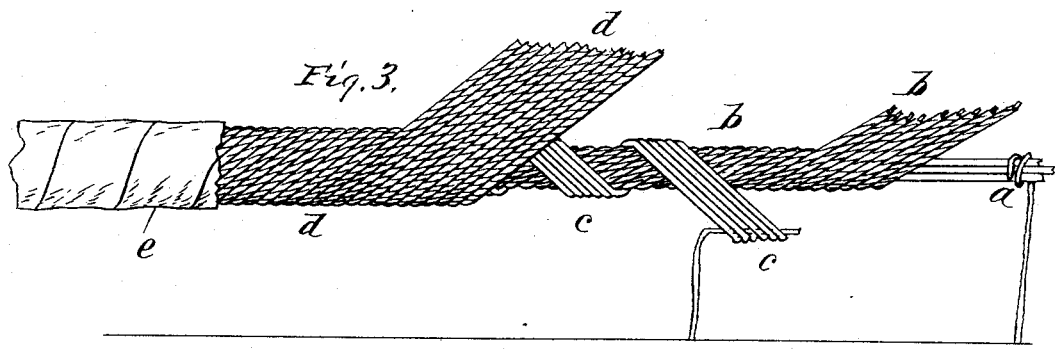
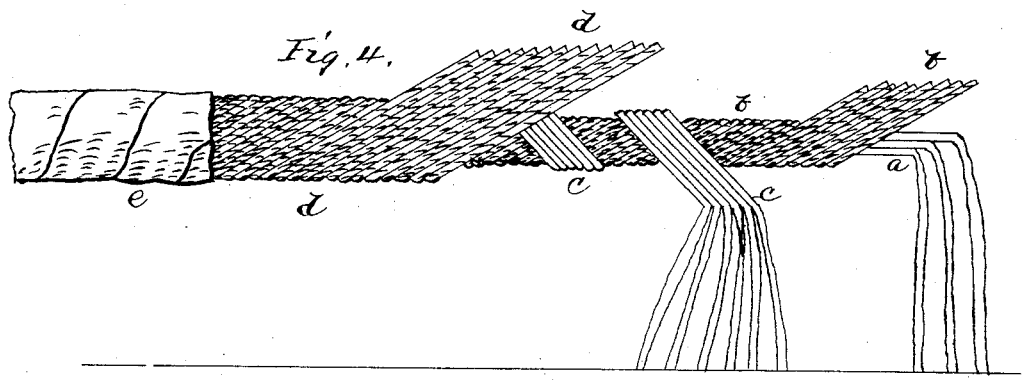
WITNESSES:
INVENTOR: C Huck
BY Munn & Co.
ATTORNEYS.

UNITED STATES PATENT OFFICE.

CHARLES HUCK, OF NEW ORLEANS, LOUISIANA.

TELEPHONE AND TELEGRAPH CABLE.

SPECIFICATION forming part of Letters Patent No. 284,425, dated September 4, 1883.

Application filed May 7, 1883. (No model.)

*To all whom it may concern:*

Be it known that I, CHARLES HUCK, of New Orleans, in the parish of Orleans and State of Louisiana, have invented a new and Improved Telephone and Telegraph Cable, of which the following is a full, clear, and exact description.

The object of my invention is to provide a new and improved telephone and telegraph cable in which bare wires are provided for carrying off the induced currents, which bare wires are so arranged that they cannot cut through the insulated wires of the cable.

The invention consists in a telephone and telegraph cable, composed of alternating layers of spirally-wound bare and insulated wires, the alternate layers being wound in opposite directions. The center of the cable is composed of one or more straight bare wires.

Reference is to be had to the accompanying drawings, forming part of this specification, in which similar letters of reference indicate corresponding parts in all the figures.

Figure 1 is a longitudinal view of my improved telephone and telegraph cable, the several wires being partly unwound. Figs. 2, 3, and 4 are similar views, showing, respectively, the wires connected separately to one ground-wire connected collectively to separate ground-wires, and each connected separately to separate ground-wires.

One or more bare copper or other good conducting-wires, $a$, form the center of the cable, and are arranged straight. Around the wires $a$ a layer composed of two or more insulated wires, $b$, is wound spirally, and around the layer of insulated wires $b$ a layer composed of two or more bare wires, $c$, is wound spirally in the inverse direction of the layer of wires $b$. Around the layer composed of bare wires $c$ a layer composed of two or more insulated wires, $d$, is wound in the inverse direction of the wires $c$, and in the same direction as the wires $b$, and so on alternately as many layers of bare or insulated wires are wound as may be desired, according to the size of the cable. The outermost layer, which consists of insulated wires, is then surrounded by a layer of insulating material, $e$, which can be surrounded by any suitable protective coverings, such as are usually used in cables.

The bare wires, which are ground-wires, are connected with the earth, so as to carry off the induced currents from the several layers of insulated wires, the central wires, $a$, being for the first layer of insulated wires $b$, the second ground-wires being for the second insulated wires, &c. Each insulated wire in each layer acts as a separate conductor to form an earth-circuit, or any two insulated wires may be used to form a metallic circuit. If the bare or ground wires are wound spirally and in the inverse direction of the insulated wires, they carry off the induced currents much better than if arranged straight and parallel with the longitudinal axis of the cable, and are not apt to cut through the insulated wires. They also counteract the strain of one layer of wires on the other.

Each layer of insulated wires, with a layer of bare wires, may be wrapped with any good insulating substance, material, or cloth to more perfectly insulate.

The wires composing the cable can be made of copper or any other good conducting material.

Having thus described my invention, what I claim as new, and desire to secure by Letters Patent, is—

1. A telephone and telegraph cable constructed with alternating layers of spirally-wound bare and insulated wires, the bare wires being wound in the inverse direction of the insulated wires, substantially as and for the purposes set forth.

2. A telephone and telegraph cable constructed with one or more central straight wires surrounded by a layer of spirally-wound insulated wires, which in turn are surrounded by bare wires wound spirally in the inverse direction of the insulated wires, substantially as and for the purpose set forth.

CHARLES HUCK.

Witnesses:
W. W. HUCK,
W. S. DELANY.